United States Patent
Artman et al.

(10) Patent No.: US 8,160,754 B2
(45) Date of Patent: Apr. 17, 2012

(54) SYNTHETIC AIR JET COOLING SYSTEM

(75) Inventors: Paul T. Artman, Austin, TX (US); Dominick Lovicott, Round Rock, TX (US); Shawn P. Hoss, Round Rock, TX (US); William K. Coxe, III, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 256 days.

(21) Appl. No.: 12/624,002

(22) Filed: Nov. 23, 2009

(65) Prior Publication Data

US 2011/0122571 A1 May 26, 2011

(51) Int. Cl.
*G05D 23/00* (2006.01)
(52) U.S. Cl. .......................................... 700/300; 700/9
(58) Field of Classification Search ............... 700/9, 299, 700/300
See application file for complete search history.

(56) References Cited

U.S. PATENT DOCUMENTS

| | | | |
|---|---|---|---|
| 5,083,104 A | 1/1992 | Bassino | |
| 6,603,658 B2 | 8/2003 | Manno et al. | |
| 7,263,837 B2 | 9/2007 | Smith | |
| 2007/0205694 A1 | 9/2007 | Hood | |
| 2009/0256512 A1* | 10/2009 | Begun et al. | 318/471 |

OTHER PUBLICATIONS

Williams et al., "Synthetic jets for forced air cooling of electronics", Electronics Cooling Magazine, May 2007.*

* cited by examiner

*Primary Examiner* — Kakali Chaki
*Assistant Examiner* — Carlos Ortiz Rodriguez
(74) *Attorney, Agent, or Firm* — Haynes and Boone, LLP

(57) ABSTRACT

A synthetic air jet cooling system includes a first component. A fan is in fluid communication with the first component. A synthetic air jet is located adjacent the first component. A thermal management engine is coupled to the first component, the fan, and the synthetic air jet. The thermal management engine is operable to receive a first component operating condition, compare the first component operating condition to a target operating condition, and increase a fan fluid flow rate from the fan and a synthetic air jet fluid flow rate from the synthetic air jet in order to reduce the difference between the first component operating condition the target operating condition. The thermal management engine increases the synthetic air jet fluid flow rate from the synthetic air jet to a predetermined synthetic air jet fluid flow rate prior to increasing the fan fluid flow rate from the fan in order to provide improvements in power consumption, airflow, and acoustics.

20 Claims, 6 Drawing Sheets

SYNTHETIC AIR JET COOLING SYSTEM

BACKGROUND

The present disclosure relates generally to information handling systems, and more particularly to a synthetic air jet cooling system for cooling an information handling system.

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Conventional IHSs typically include one or more fans to cool the components of the IHS. The power to run these fans can be a large contributor to the overall power consumption of the IHS, particularly when fan speed is increased in response to transient heat increases from specific IHS components. Advances in more cooling-efficient IHS layouts have been used to reduce system power consumption, but when IHS layouts are dictated by issues other than power consumption, cooling system power consumption remains an issue.

Accordingly, it would be desirable to provide an improved cooling system.

SUMMARY

According to one embodiment, a synthetic air jet cooling system includes a first component, a fan in fluid communication with the first component, a synthetic air jet located adjacent the first component, and a thermal management engine coupled to the first component, the fan, and the synthetic air jet, wherein the thermal management engine is operable to receive a first component operating condition, compare the first component operating condition to a target operating condition, and increase a fan fluid flow rate from the fan and a synthetic air jet fluid flow rate from the synthetic air jet in order to reduce the difference between the first component operating condition the target operating condition, and wherein the thermal management engine increases the synthetic air jet fluid flow rate from the synthetic air jet to a predetermined synthetic air jet fluid flow rate prior to increasing the fan fluid flow rate from the fan.

BRIEF DESCRIPTION OF THE DRAWINGS

FIG. 2b is a perspective view illustrating an embodiment of a synthetic air jet located adjacent a first component in the IHS of FIG. 2a.

FIG. 2d is a schematic view illustrating an embodiment of a synthetic air jet cooling system used in the IHS of FIG. 2a.

DETAILED DESCRIPTION

For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a PDA, a consumer electronic device, a network server or storage device, a switch router or other network communication device, or any other suitable device and may vary in size, shape, performance, functionality, and price. The IHS may include memory, one or more processing resources such as a central processing unit (CPU) or hardware or software control logic. Additional components of the IHS may include one or more storage devices, one or more communications ports for communicating with external devices as well as various input and output (I/O) devices, such as a keyboard, a mouse, and a video display. The IHS may also include one or more buses operable to transmit communications between the various hardware components.

Figure 1:
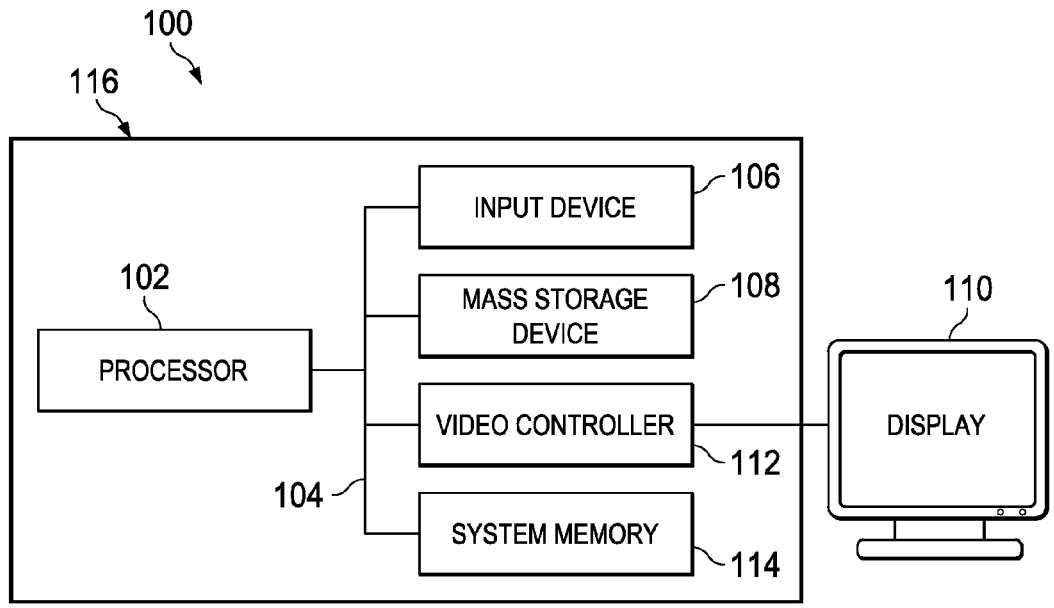
FIG. 1 is a schematic view illustrating an embodiment of an IHS.
Figure 3:
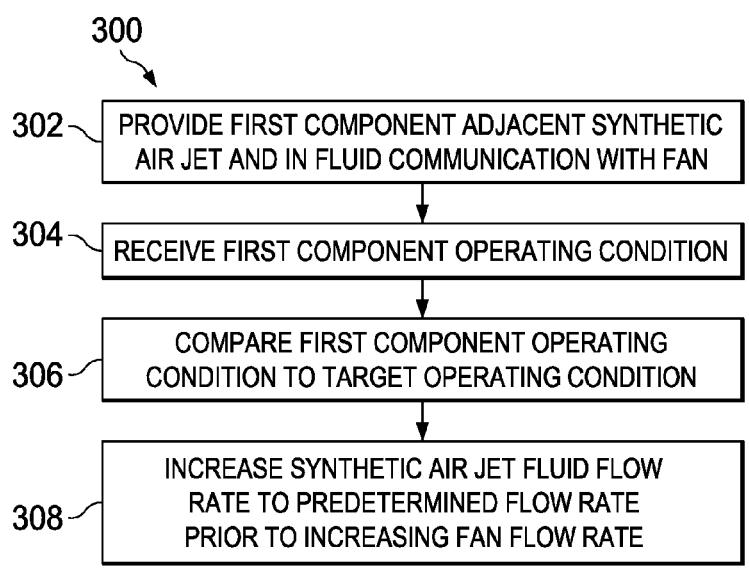
FIG. 3 is a flow chart illustrating an embodiment of a method for cooling a component.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2A:
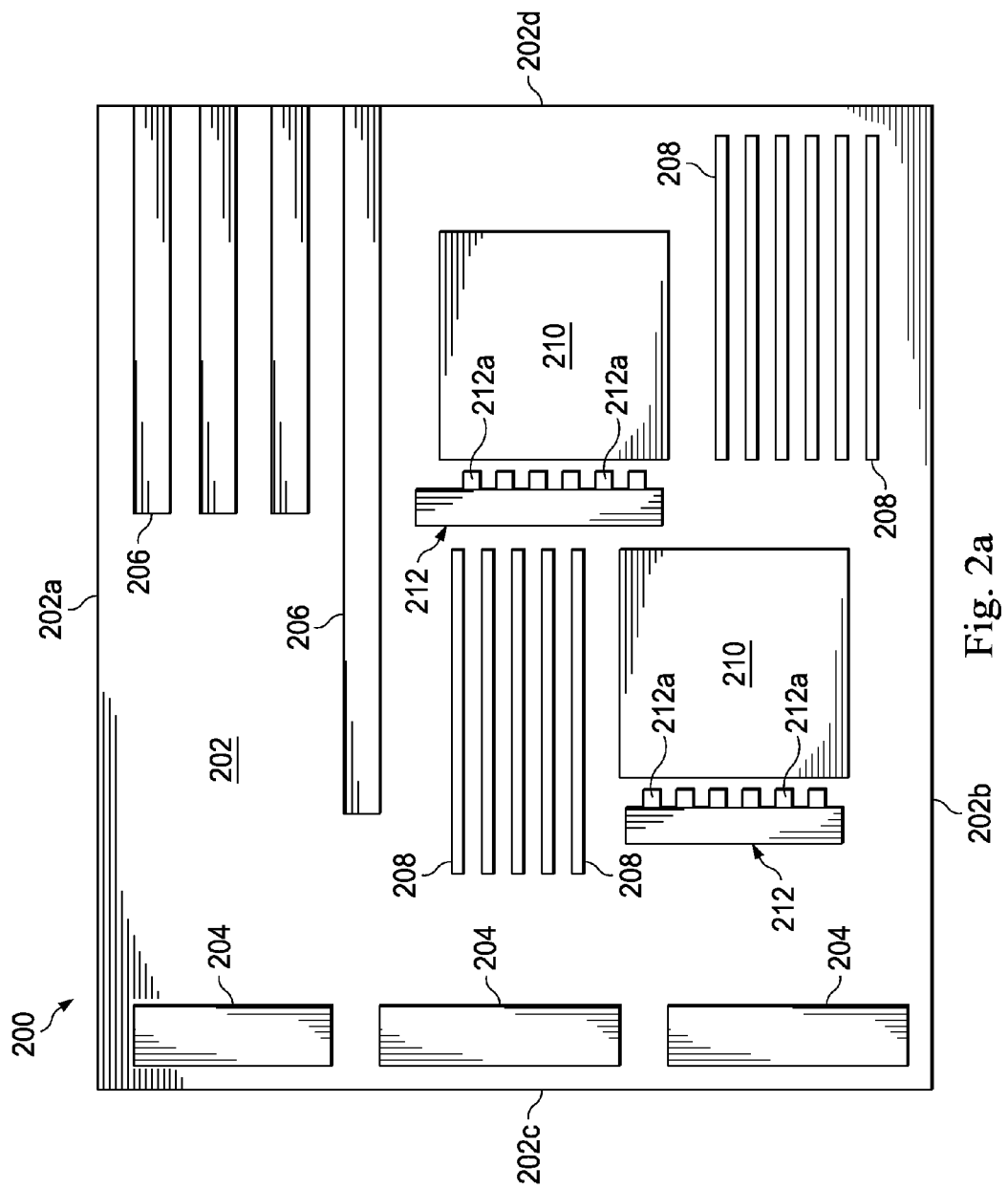
FIG. 2a is a top view illustrating an embodiment of an IHS.
Figure 2B:
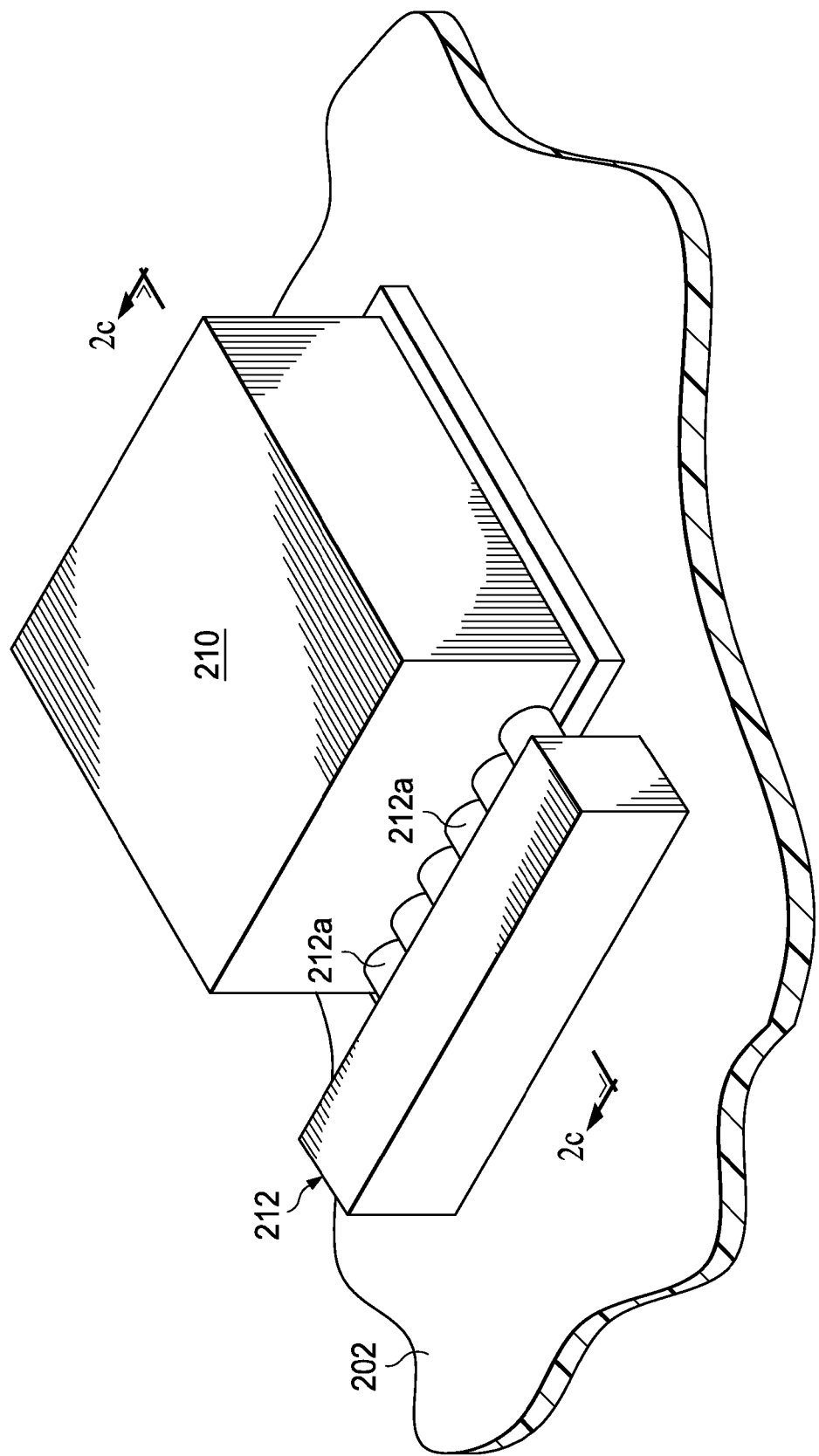
Figure 2C:
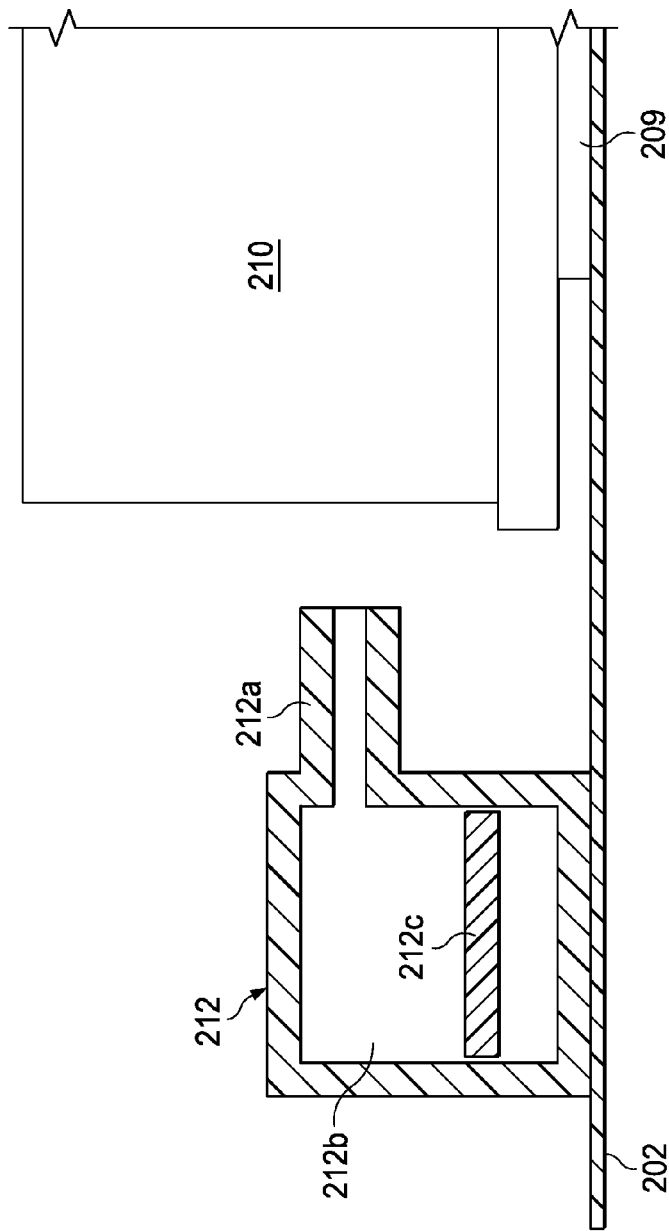
FIG. 2c is a cross-sectional view illustrating an embodiment of the synthetic air jet and first component of FIG. 2b.

Referring now to FIGS. 2a, 2b, 2c and 2d, an IHS 200 is illustrated that may be, for example, the IHS 100 described above with reference to FIG. 1, and that may include some or all of the components of the IHS 100. The IHS 200 includes a board 202 that may be located a chassis such as, for example, the chassis 116 described above, and that includes a top edge 202a, a bottom edge 202b located opposite the top edge 202a, and a pair of side edges 202c and 202d extending between the top edge 202a and the bottom edge 202b. A plurality of fans 204 are mounted to the board 202 adjacent the side edge 202c. A plurality of cards 206 are coupled to the board 202 adjacent the top edge 202a and the side edge 202d. A plurality of memory devices 208 are coupled to the board 202 at multiple locations on the board 202 (e.g., in the illustrated embodiment, at a central location on the board 202a between the top edge 202a, the bottom edge 202b, and the side edges 202c and 202d, and adjacent the side edge 202d and the bottom edge 202b.) A plurality of processors 209, which may be the processor 102 described above with reference to FIG. 1, are mounted to the board 202 (as illustrated in FIG. 2c) adjacent the memory devices 208 and a heat sink 210 is mounted to each processor 209. In an embodiment, each processor 209 and heat sink 210 combination may be referred to as a "first component", and each card 206, memory device 208, or other IHS component may be referred to as a "second component." However, one of skill in the art will recognize that a "first component," as used in the present disclosure, may include any IHS component that produces heat with transient heat and/or power usage spikes, as will be described in further detail below. In the illustrated embodiment, each card 206, memory device 208, and processor 209 and heat sink 210 combination is located on the board 202 in fluid communication with the fans 204 such that a fan fluid flow created by the operation of the fans 204 will move adjacent the cards 206, the memory devices 208, and the processor 209 and heat sink 210 combinations in order to cool them convectively.

A synthetic air jet 212 is mounted to the board 202 and located adjacent each processor 209 and heat sink 210 combination. In the illustrated embodiment, each synthetic air jet 212 includes a plurality of nozzles 212a that are directed at the heat sinks 210, a cavity 212b defined by the synthetic air jet 212a and located adjacent the nozzles 212a, and a diaphragm 212c that is located in the cavity 212b and movably coupled to the synthetic air jet 212. The synthetic air jet 212 of the illustrated embodiment may operate through movement of the diaphragm 212c, which is operable to push fluid (e.g., air) out of the nozzles 212a. The fluid pushed out of each nozzle 212a by the diaphragm 212c will entrain fluid that is located adjacent the synthetic air jet 212 (which is typically about ten times the fluid ejected from the nozzle 212a) and create a synthetic air jet fluid flow that is directed at the heat sink 210 and that moves adjacent the heat sink 210 to cool it convectively. In an embodiment, the synthetic air jet 212 may include an electromagnetic driver, a piezoelectric driver, a mechanical driver, and/or a variety of other drivers known in the art, in order to move the diaphragm 212c. While the synthetic air jets 212 have been described and illustrated as being located in a specific position on the IHS 200, one of skill in the art will recognize that the size and orientation independent of the synthetic air jets allow great flexibility in their positioning within an IHS without departing from the scope of the present disclosure.

Figure 2D:
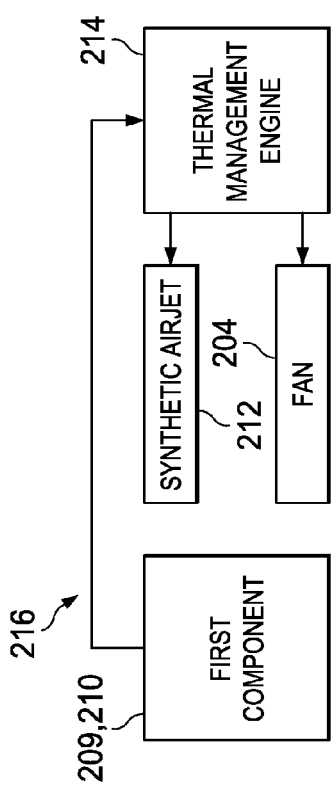

A thermal management engine 214 which may include, for example, software that includes computer-executable instructions located on a computer-readable medium in the IHS 100 or 200 (e.g., the storage 108, the system memory 114, etc), is coupled to each "first component" (i.e., the processor 209 and heat sink combination 210), the synthetic air jet 212, and the fans 204, as illustrated in FIG. 2d, in order to be operable to increase a synthetic air jet fluid flow rate for a synthetic air jet fluid flow from the synthetic air jet 212 and to increase a fan fluid flow rate for a fan fluid flow from the fans 204. In an embodiment, the thermal management engine 214 is operable to control the synthetic air jet 212 independently from the fans 204. In an embodiment, the thermal management engine 214, synthetic air jet 212, fans 204, and the first component provide a synthetic air jet cooling system 216. The thermal management engine 214 may include a plurality of target operating conditions for the first component, and is operable to receive first component operation conditions of the first component through its coupling with the first component, as will be explained in further detail below. The thermal management engine 214 may also include filter algorithms and/or other instructions for controlling fan fluid flow from the fan and synthetic air jet fluid flow from the synthetic air jet, as will be explained in further detail below.

Referring now to FIGS. 2a, 2b, 2c, 2d and 3, a method 300 for cooling a component is illustrated. The method 400 begins at block 402 where a first component is provided that is located adjacent a synthetic air jet and in fluid communication with a fan. In an embodiment, the first component (e.g., the processor 209 and heat sink 210 combination) is provided that is located adjacent the synthetic air jet 212 and in fluid communication with the fans 204. In an embodiment, the method 400 may begin with the thermal management engine 214 causing the fans 204 to provide a fan fluid flow at a substantially constant fan fluid flow rate to the first component and the second components (e.g., the cards 206, the memory devices 208, and other IHS components known in the art). The method 300 the proceeds to block 304 where a first component operating condition is received. Through the coupling of the thermal management engine 214 and the first component, the thermal management engine 214 receives a first operating condition of the first component. In an embodiment, the first component operating condition includes a temperature of the first component (e.g., a temperature of the processor 209 and/or a temperature of the heat sink 210). In an embodiment, the first component operating condition includes a power usage of the first component (e.g., a power usage of the processor 209). In an embodiment, the thermal management engine 214 is also operable to receive a fan speed of one or more of the fans 204 at block 304 of the method 300, which may be indicative of an operating condition of the first component.

The method 300 then proceeds to block 306 where the first component operating condition is compared to a target operating condition. As described above, the thermal management engine 214 may include a plurality of target operating conditions for the first component. Those target operating conditions may include, for example, a target temperature of the first component, a target power usage of the first component, a target speed for the fans 204, and/or a variety of other target operating conditions known in the art. The thermal management engine 214 is operable to take the first component operating condition received in block 304 of the method 300 and compare it to the target operating condition in order to determine the difference between the first component operating condition and the target operating condition. In an embodiment, the first component operating condition may be a first component temperature and the target operating condition may be a target temperature for the first component, and the thermal management engine 214 may determine that the first component temperature is greater than the target temperature. In an embodiment, the first component operating condition may be the first component power usage and the target operating condition may be a target power usage for the first component, and the thermal management engine 214 may determine that the first component power usage is greater than the target power usage. In an embodiment, the first component operating condition may be the a speed of the fans 204 and the target operating condition may be a target fan speed, and the thermal management engine 214 may determine that the fan speed is greater than the target fan speed.

The method 300 then proceeds to block 308 where a synthetic air jet fluid flow rate of a synthetic air jet fluid flow from the synthetic air jet is increased to a predetermined synthetic air jet fluid flow rate prior to increasing a fan fluid flow rate of a fan fluid flow from the fans. In an embodiment, as stated above, the thermal management engine 214 causes the fans 204 to provide a fan fluid flow to the first component (i.e., the processor 209 and heat sink 210 combination) and the second components (i.e., cards 206 and the memory devices 208) at a substantially constant fan fluid flow rate. It has been found that fans may be operated efficiently to provide a fan fluid flow at a constant fan fluid flow rate in order to cool a plurality of components under typical operating conditions. However, cooling system power consumption is greatly increased when the fan speed of the fans is increased to provide additional cooling for a specific component. For example, the first component and the second components may be efficiently cooled by the fan fluid flow from the fans 204 at the constant fan fluid flow rate described above. However, during times when there are high levels of utilization of the processor 102, 209, during periods when the processor 102, 209 exhibits transient thermal responses, and/or during a variety of other transient high power usage/heat producing scenarios known in the art, increases in the speed of the fans 204 in order to reduce the temperature of the processor 102, 209 greatly increases the cooling system power consumption as the power used by the fans 204 increases as a cubic function of the speed of the fans 204. In order to reduce such power consumption, the thermal management engine 214 is operable to increases the synthetic air jet fluid flow rate of the synthetic air jet fluid flow from the synthetic air jet 212 to a predetermined synthetic air jet fluid flow rate prior to increasing the fan fluid flow rate of the fan fluid flow from the fan 204 in order to reduce the difference between the first component operating condition and the target operating condition. In an embodiment, the predetermined synthetic air jet fluid flow rate may be a maximum synthetic air jet fluid flow rate or a percentage of the maximum synthetic air jet fluid flow rate, as may be determined by, for example, the cooling needs of the first component. Because synthetic air jets operate at fractions of a watt, and because power used by the synthetic air jets 212 scale more favorably than power used to increase fan speeds, the power consumed to cool the first components (i.e., the processor 209 and heat sink 210 combinations) during transient increases in heat and/or power usage can be greatly reduced relative to conventional systems. Thus, the synthetic air jets 212 are activated during high levels of utilization of the processor 102, 209 and/or in response to temperature or workload spikes of the processor 204 to eliminate short bursts of higher system fan speeds that rare typical of conventional systems and that increase power consumption. In the event the maximum synthetic air jet fluid flow rate does not adequately cool the first component, the thermal management engine 214 may increase the fan fluid flow rate from the fans 204.

Figure 4A:
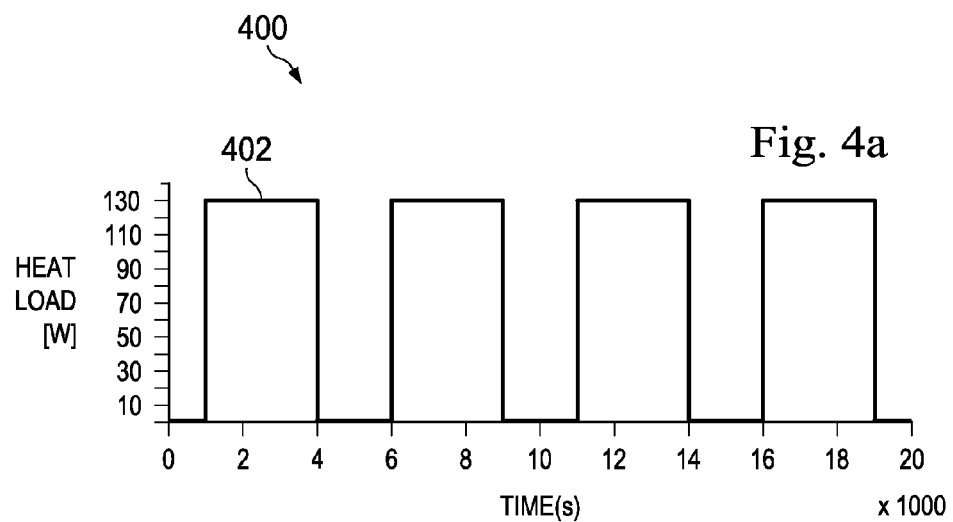
FIG. 4a is a graph illustrating an experimental embodiment of the cooling system of FIGS. 2a, 2b, 2c and 2d.
Figure 4B:
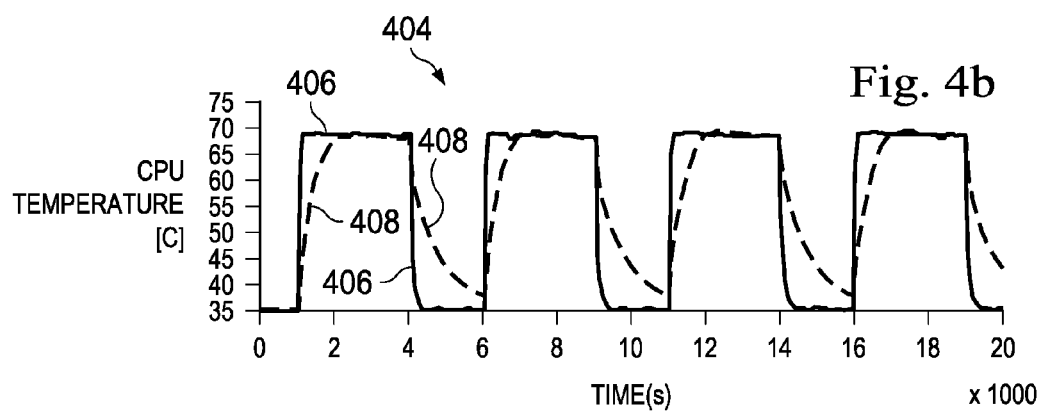
FIG. 4b is a graph illustrating an experimental embodiment of the cooling system of FIGS. 2a, 2b, 2c and 2d.
Figure 4C:
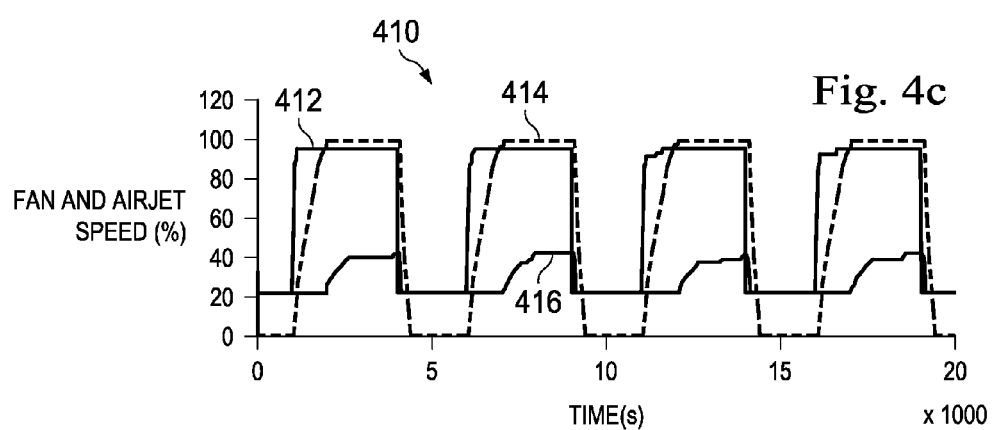
FIG. 4c is a graph illustrating an experimental embodiment of the cooling system of FIGS. 2a, 2b, 2c and 2d.
Figure 4D:
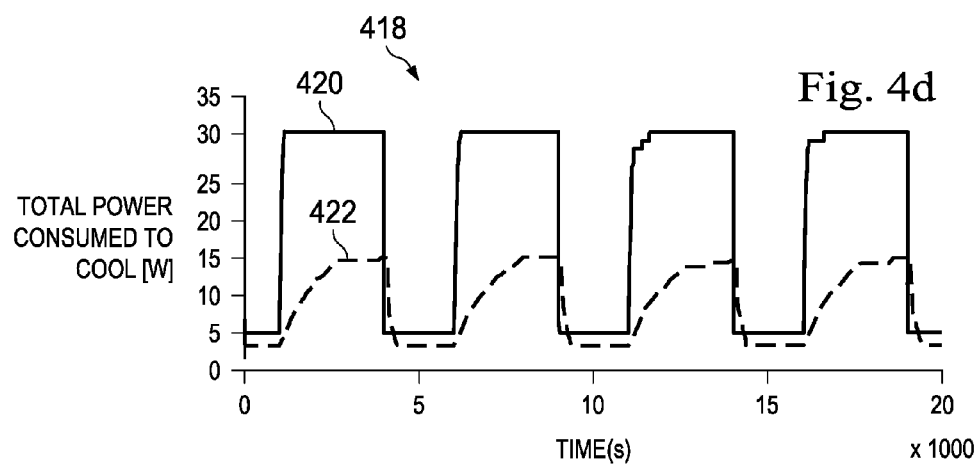
FIG. 4d is a graph illustrating an experimental embodiment of the cooling system of FIGS. 2a, 2b, 2c and 2d.

In an experimental embodiment, a cooling system in an IHS was simulated that was similar to the IHS 200, described above, to determine the power savings between a fan-only cooling system and the fan-synthetic air jet cooling system described above. FIG. 4a illustrates heat load graph 400 that tracks heat load versus time. A line 402 tracks a transient heat load from a processor (e.g., the processor 102, 209) of 130 watts applied for 3 second intervals separated by 2 second intervals of an 8 watt heat load. FIG. 4b illustrates a temperature graph 404 that tracks processor temperature versus time. A line 406 tracks a temperature response of a processor (e.g., the temperature response of the processor 102, 209) to cooling fluid flow supplied by a fan only (e.g., the fans 204) for the heat load illustrated in FIG. 4a, and a line 408 tracks a temperature response of a processor (e.g., the temperature response of the processor 102, 209) to cooling fluid flow supplied by a fan (e.g., the fans 204) combined with a synthetic air jet (e.g., the synthetic air jet 212) as described above for the heat load illustrated in FIG. 4a. FIG. 4c illustrates a cooling device speed graph 410 that tracks cooling device speed versus time. A line 412 tracks only the fan speed (as a percentage of a maximum speed of the fan) of a fan (e.g., the fans 204) needed to cool a processor (e.g., the processor 102, 209) as illustrated in FIG. 4b in response to the heat load illustrated in FIG. 4a. A line 414 tracks a synthetic air jet speed (as a percentage of a maximum speed of the synthetic air jet) of a synthetic air jet (e.g., the synthetic air jet 212) and a line 416 tracks the fan speed (as a percentage of a maximum speed of the fan) of a fan (e.g., the fans 204) used in combination to cool a processor (e.g., the processor 102, 209) as illustrated in FIG. 4b in response to the heat load illustrated in FIG. 4a. As can be seen from FIG. 4c, the fan/synthetic air jet combination (42% of the maximum fan speed) resulted in a 56% lower fan speed than is used when only the fan (92% of the maximum fan speed) is used to cool the processor. Lower fan speeds can improve system acoustics by reducing noise associated with the fans. FIG. 4d illustrates a power consumed graph 418 that tracks total power consumed versus time. A line 420 tracks the total power consumed by a fan (e.g., the fans 204) when only the fan is used to cool the processor as illustrated in FIG. 4b in response to the heat load illustrated in FIG. 4a. A line 422 tracks the total power consumed by a fan (e.g., the fans 204) and a synthetic air jet (e.g., the synthetic air jet 212) when the fan/synthetic air jet combination is used to cool the processor as illustrated in FIG. 4b in response to the heat load illustrated in FIG. 4a. As can be seen from FIG. 4d, the fan/synthetic air jet combination uses 50% less power (15 watts versus 30 watts) than is used when only the fan is used to cool the processor. Thus, a synthetic air jet cooling system is provided that allows cooling to be focused on specific components in a cooled system during transient heat/power usage episodes in order to enable a wider variety of system layouts while providing improvement in power consumption, airflow, and acoustics relative to conventional systems.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A synthetic air jet cooling system, comprising:
an information handling system (IHS) chassis;
a first IHS component located in the IHS chassis;
a fan in fluid communication with the first IHS component in the IHS chassis;
a synthetic air jet located adjacent the first IHS component in the IHS chassis;
and a thermal management engine coupled to the first IHS component, the fan, and the synthetic air jet, wherein the thermal management engine is operable to operate the fan and the synthetic air jet in order to cool the first IHS component, and wherein, with the synthetic air jet not operating and the fan operating to provide a substantially constant fan fluid flow rate, the thermal management engine is operable to receive a first IHS component operating condition that is indicative of a transient heat increase and, in response, determine that the fan is operating to provide the constant fan fluid flow rate and, in response, provide a synthetic air jet fluid flow rate from the synthetic air jet, while maintaining the constant fan fluid flow rate from the fan in order to provide cooling for the transient heat increase.

2. The system of claim 1, wherein the thermal management engine is operable to cause the fan to provide the substantially constant fan fluid flow rate prior to increasing the synthetic air jet fluid flow rate.

3. The system of claim 1, wherein the thermal management engine is operable to increase the synthetic air jet fluid flow rate from the synthetic air jet independently from increasing the fan fluid flow rate from the fan, and wherein the thermal management engine is operable to increase the fan fluid flow rate from the fan independently from increasing the synthetic air jet fluid flow rate from the synthetic air jet.

4. The system of claim 1, wherein the fan is in fluid communication with, and provides a fan fluid flow to, the first IHS component and at least one second component.

5. The system of claim 4, wherein the synthetic air jet provides a synthetic air jet fluid flow to the first IHS component.

6. The system of claim 1, wherein the component operating condition comprises a component temperature, and the target operating condition comprises a target temperature.

7. The system of claim 1, wherein the component operating condition comprises a component power usage, and the target operating condition comprises a target power usage.

8. A synthetic air jet cooling system, comprising:
a first information handling system (IHS) component;
a fan in fluid communication with the first IHS component;
a synthetic air jet located adjacent the first IHS component; and
a thermal management engine coupled to the first component, the fan, and the synthetic air jet, wherein the thermal management engine is operable to receive a first component operating condition, compare the first component operating condition to a target operating condition, and increase a fan fluid flow rate from the fan and a synthetic air jet fluid flow rate from the synthetic air jet in order to reduce the difference between the first component operating condition and the target operating condition, wherein the thermal management engine increases the synthetic air jet fluid flow rate from the synthetic air jet to a predetermined synthetic air jet fluid flow rate prior to increasing the fan fluid flow rate from the fan, and wherein a fan speed of the fan is indicative of the first component operating condition and the thermal management engine is operable to compare the fan speed to a target speed and increase the synthetic air jet fluid flow rate from the synthetic air jet in order to reduce the difference between the fan speed and the target speed.

9. An information handling system (IHS), comprising:
an IHS chassis;
a processor coupled to the IHS chassis;
a heat sink mounted to the processor;
a fan in fluid communication with the heat sink;
a synthetic air jet located adjacent the heat sink; and
a thermal management engine coupled to the processor, the fan, and the synthetic air jet, wherein the thermal management engine is operable to operate the fan and the synthetic air jet in order to cool the processor, and wherein, with the synthetic air jet not operating and the fan operating to provide a substantially constant fan fluid flow rate, the thermal management engine is operable to receive processor operating condition that is indicative of a transient heat increase and, in response, determine that the fan is operating to provide the constant fan fluid flow rate and, in response, provide a synthetic air jet fluid flow rate from the synthetic air jet, while maintaining the constant fan fluid flow rate from the fan in order to provide cooling for the transient heat increase.

10. The system of claim 9, wherein the thermal management engine is operable to cause the fan to provide the substantially constant fan fluid flow rate prior to increasing the synthetic air jet fluid flow rate.

11. The system of claim 9, wherein the thermal management engine is operable to increase the synthetic air jet fluid flow rate from the synthetic air jet independently from increasing the fan fluid flow rate from the fan, and wherein the thermal management engine is operable to increase the fan fluid flow rate from the fan independently from increasing the synthetic air jet fluid flow rate from the synthetic air jet.

12. The system of claim 9, wherein the fan is in fluid communication with, and provides a fan fluid flow to, the heat sink and at least one additional IHS component.

13. The system of claim 12, wherein the synthetic air jet provides a synthetic air jet fluid flow to the heat sink.

14. The system of claim 9, wherein the processor operating condition comprises a processor temperature, and the target operating condition comprises a target temperature.

15. The system of claim 9, wherein the processor operating condition comprises a processor power usage, and the target operating condition comprises a target power usage.

16. An IHS, comprising
an IHS chassis;
a processor coupled to the IHS chassis;
a heat sink mounted to the processor;
a fan in fluid communication with the heat sink;
a synthetic air jet located adjacent the heat sink; and
a thermal management engine coupled to the processor, the fan, and the synthetic air jet, wherein the thermal management engine is operable to receive a processor operating condition, compare the processor operating condition to a target operating condition, and increase a fan fluid flow rate from the fan and a synthetic air jet fluid flow rate from the synthetic air jet in order to reduce the difference between the processor operating condition and the target operating condition, wherein the thermal management engine increases the synthetic air jet fluid flow rate from the synthetic air jet to a predetermined synthetic air jet fluid flow rate prior to increasing the fan fluid flow rate from the fan, and wherein a fan speed of the fan is indicative of the processor operating condition and the thermal management engine is operable to compare the fan speed to a target speed and increase the synthetic air jet fluid flow rate from the synthetic air jet in order to reduce the difference between the fan speed and the target speed.

17. A method for cooling a component, comprising:
providing an information handling system (IHS) chassis that houses a fan in fluid communication with a first IHS component and a synthetic air jet located adjacent the first component;

operating the fan to provide a substantially constant fan fluid flow rate;

receiving a first component operating condition that is indicative of a transient heat increase and, in response, determining that the fan is operating to provide the constant fan fluid flow rate; and in response to determining that the fan is operating to provide the constant fan fluid flow rate, providing a synthetic air jet fluid flow rate from the synthetic air jet, while maintaining the constant fan fluid flow rate from the fan, in order to provide cooling for the transient heat increase.

18. The method of claim 17, further comprising:
providing the substantially constant fan fluid flow rate from the fan prior to increasing the synthetic air jet fluid flow rate.

19. The method of claim 18, wherein the substantially constant fan fluid flow rate is provided to the first IHS component and at least one second component.

20. The method of claim 19, wherein the synthetic air jet fluid flow rate is provided to the first IHS component.

* * * * *